(12) United States Patent
Winternitz et al.

(10) Patent No.: US 9,075,618 B2
(45) Date of Patent: Jul. 7, 2015

(54) CROSS-PLATFORM DATA VISUALIZATIONS USING COMMON DESCRIPTIONS

(71) Applicant: Microsoft Corporation, Redmond, WA (US)

(72) Inventors: Fabian O. Winternitz, Kirkland, WA (US); Aditya Unnithan, Seattle, WA (US); David Paul Hill, Redmond, WA (US); Jeffrey A. Davis, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 230 days.

(21) Appl. No.: 13/668,206

(22) Filed: Nov. 2, 2012

(65) Prior Publication Data

US 2014/0125672 A1  May 8, 2014

(51) Int. Cl.
*G06F 3/048* (2013.01)
*G06F 9/44* (2006.01)

(52) U.S. Cl.
CPC ........................................ *G06F 8/38* (2013.01)

(58) Field of Classification Search
USPC .................................. 345/522, 619; 707/693
See application file for complete search history.

(56) References Cited

U.S. PATENT DOCUMENTS

| | | | |
|---|---|---|---|
| 6,078,322 A | 6/2000 | Simonoff et al. | |
| 6,919,891 B2 | 7/2005 | Schneider et al. | |
| 7,061,486 B2 | 6/2006 | Sowizral et al. | |
| 7,466,315 B2 | 12/2008 | Beda et al. | |
| 2003/0070061 A1 | 4/2003 | Wong et al. | |
| 2004/0139157 A1* | 7/2004 | Neely et al. | 709/205 |
| 2004/0207667 A1* | 10/2004 | Purves et al. | 345/856 |
| 2005/0140694 A1* | 6/2005 | Subramanian et al. | 345/619 |
| 2006/0123345 A1 | 6/2006 | Parimi | |
| 2008/0293395 A1 | 11/2008 | Mathews et al. | |

(Continued)

OTHER PUBLICATIONS

"International Search Report & Written Opinion for PCT Patent Application No. PCT/US2013/068148", Mailed Date: Jun. 6, 2014, Filed Date: Nov. 1, 2013, 17 Pages.

(Continued)

*Primary Examiner* — Phi Hoang
(74) *Attorney, Agent, or Firm* — Brian Haslam; Mike Allen; Micky Minhas

(57) ABSTRACT

The present invention extends to methods, systems, and computer program products for cross-platform data visualizations using common descriptions. Embodiments of the invention provide mechanisms for simplifying software development and enhanced code reliability. A user interface, along with interactive and dynamic characteristics, can be described (programmatically and/or declaratively) independently of any specific device platform. User interface qualities can be described using a generic scene graph structure with attached behaviors. The generic scene graph can then be used to drive the user interface on any number of different computing platforms using platform specific (e.g., rendering, gesture recognition, etc.) sub-systems. Platform specific sub-systems can vary based on technologies that are used by the platform specific sub-systems. For example, rendering sub-systems can vary based on the technology used to render graphical data, such as, for example, Open GL, XAML, Direct X, Quartz, etc.

20 Claims, 6 Drawing Sheets

(56) References Cited

U.S. PATENT DOCUMENTS

2010/0013842 A1* 1/2010 Green et al. ................. 345/522
2010/0118038 A1   5/2010 Labour et al.
2012/0204210 A1* 8/2012 Hunleth et al. ................ 725/39
2013/0117243 A1* 5/2013 Carter .......................... 707/693

OTHER PUBLICATIONS

"Open Scene Graph", Retrieved at <<http://www.openscenegraph.com/index.php/about/features>>, Retrieved on Oct. 30, 2012, pp. 3.

* cited by examiner

CROSS-PLATFORM DATA VISUALIZATIONS USING COMMON DESCRIPTIONS

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

Different computing platforms (e.g., Windows, iOS, etc.) typically use different platform specific technologies for interacting with (e.g., rendering and receiving input gestures from) data visualizations, such as, for example, charts, grids, tiles, etc. Due to differences and complexities in platform specific technologies, developing consistent, highly interactive user interfaces for use across multiple computing platforms can be challenging and time consuming. For example, developers may have to maintain multiple code bases, one for each different computing platform in use. Each code base can include various platform specific mechanisms available to a computing platform and that may differ across different computing platforms.

Other cross platform development challenges include difficult of testing of cross-platform applications. Testing cross-platform applications may be considerably more complicated, since different platforms can exhibit slightly different behaviors or subtle bugs. Further, developers are often restricted to using the lowest common denominator subset of features which are available on all platforms. This may hinder the application's performance or prohibit developers from using platforms' most advanced features.

Different platforms often have different user interface conventions, which cross-platform applications do not always accommodate. For example, applications developed for Mac OS X and GNOME are supposed to place the most important button on the right-hand side of a window or dialog, whereas Microsoft Windows and KDE have the opposite convention. Though many of these differences are subtle, a cross-platform application which does not conform appropriately to these conventions may feel clunky or alien to the user. When working quickly, such opposing conventions may even result in data loss, such as in a dialog box confirming whether the user wants to save or discard changes to a file.

Cross-platform execution environments may also suffer cross-platform security flaws, creating an environment susceptible to cross-platform malware.

BRIEF SUMMARY

The present invention extends to methods, systems, and computer program products for cross-platform data visualizations using common descriptions. Some embodiments of the invention include outputting data visualizations. A scene graph processing layer accesses a generic scene graph from common code that is executable on a plurality of different technology platforms. The generic scene graph represents a user interface. The generic scene graph defines data visualizations independent of any of a plurality of different platform specific user interface sub-systems. The generic scene graph contains scene graph metadata that describes characteristics of the data visualizations.

The scene graph processing layer interprets the structure and data of at least portions of the generic scene graph into specific operations that are processed by a platform specific rendering sub-system. The scene graph processing layer makes decisions on how to process individual scene graph nodes or groups of scene graph nodes based on the characteristics of rendering subsystems a platform provides. For example, the scene graph processing layer can make decisions based on the most optimal rendering sub-system the platform provides. The scene graph processing layer sends the specific operations to the platform specific rendering sub-system for processing. The platform specific rendering sub-system outputs the data visualizations by processing the specific operations. Outputting data visualizations can include rendering to a display device, writing to a file, sending via network communication to another system, etc.

Other embodiments of the invention include processing an input gesture. A scene graph processing layer accesses a generic scene graph from common code that is executable on a plurality of different technology platforms. The generic scene graph represents a user interface. The generic scene graph defines behaviors for input gesture processing independent of any of a plurality of different platform specific user interface sub-systems. The generic scene graph contains scene graph metadata that describes characteristics of the behaviors.

The scene graph processing layer receives input gesture data from a platform specific user interface sub-system. The input gesture data is for an input gesture recognized by utilizing a gesture recognition technique available to the platform specific user interface sub-system. The scene graph processing layer adjusts the input gesture data for consistency with the generic scene graph based on the utilized gesture recognition technique and in view of the scene graph metadata. The scene graph processing layer routes the adjusted input gesture data to an appropriate behavior in the generic scene graph.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
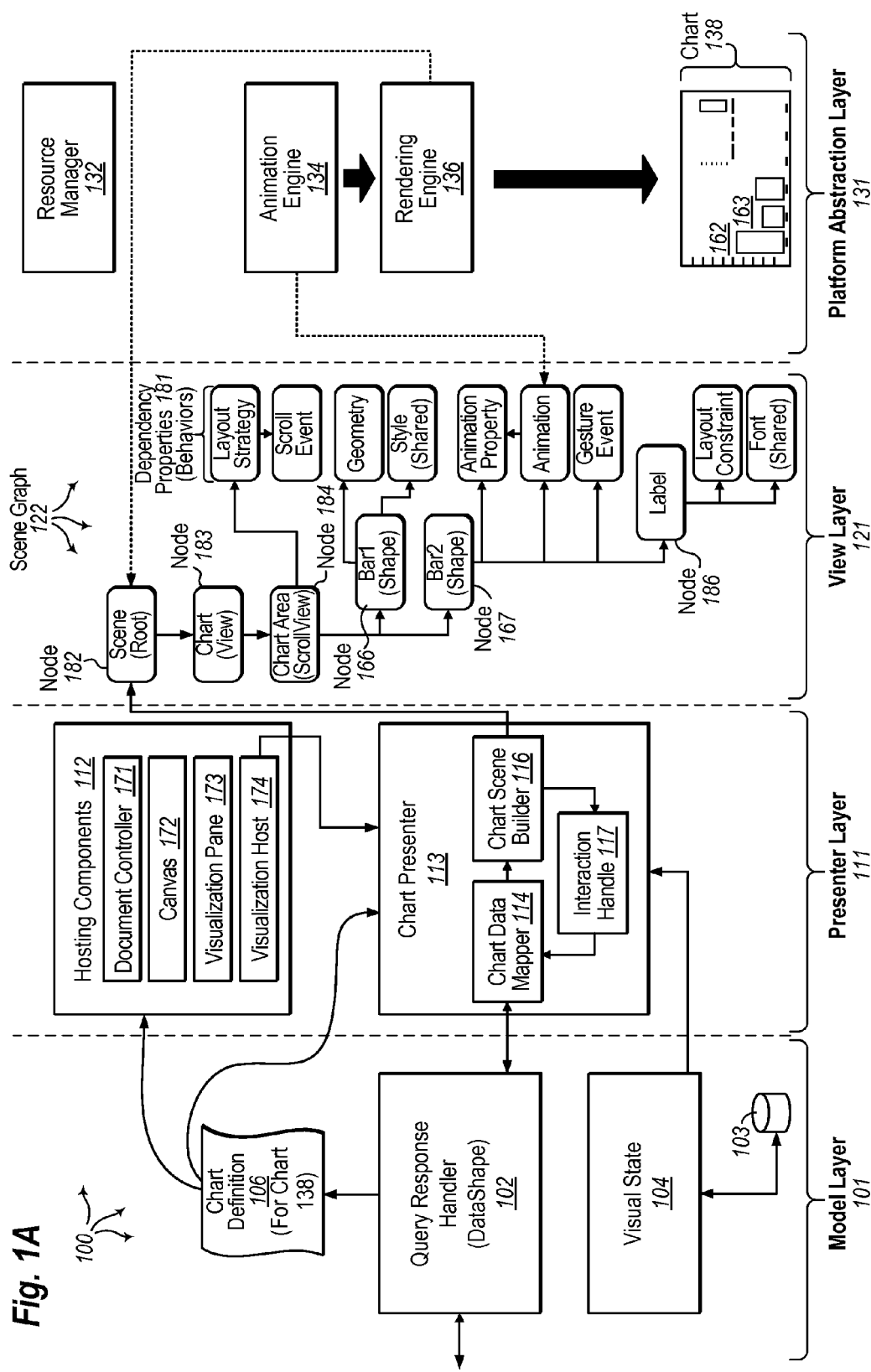
FIGS. 1A and 1B illustrate an example computer architecture that facilitates cross-platform data visualizations using common descriptions.

The present invention extends to methods, systems, and computer program products for cross-platform data visualizations using common descriptions. Some embodiments of the invention include outputting data visualizations. A scene graph processing layer accesses a generic scene graph from common code that is executable on a plurality of different technology platforms. The generic scene graph represents a user interface. The generic scene graph defines data visualizations independent of any of a plurality of different platform specific user interface sub-systems. The generic scene graph contains scene graph metadata that describes characteristics of the data visualizations.

The scene graph processing layer interprets the structure and data of at least portions of the generic scene graph into specific operations that are processed by the platform specific user interface sub-system. The scene graph processing layer makes decisions on how to process individual scene graph nodes or groups of scene graph nodes based on the characteristics of rendering subsystems a platform provides. For example, the scene graph processing layer can make decisions based on the most optimal rendering sub-system the platform provides. The scene graph processing layer sends the specific operations to the platform specific rendering sub-system for processing. The platform specific rendering sub-system outputs the data visualizations by processing the specific operations. Outputting data visualizations can include rendering to a display device, writing to a file, sending via network communication to another system, etc.

Other embodiments of the invention include processing an input gesture. A scene graph processing layer accesses a generic scene graph from common code that is executable on a plurality of different technology platforms. The generic scene graph represents a user interface. The generic scene graph defines behaviors for input gesture processing independent of any of a plurality of different platform specific user interface sub-systems. The generic scene graph contains scene graph metadata that describes characteristics of the behaviors.

The scene graph processing layer receives input gesture data from a platform specific user interface sub-system. The input gesture data is for an input gesture recognized by utilizing a gesture recognition technique available to the platform specific user interface sub-system. The scene graph processing layer adjusts the input gesture data for consistency with the generic scene graph based on the utilized gesture recognition technique and in view of the scene graph metadata. The scene graph processing layer routes the adjusted input gesture data to an appropriate behavior in the generic scene graph.

Embodiments of the present invention may comprise or utilize a special purpose or general-purpose computer including computer hardware, such as, for example, one or more processors, system memory, and a touch screen display device, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

Embodiments of the invention provide mechanisms for simplifying software development and enhanced code reliability. A user interface, along with interactive and dynamic characteristics, can be described (programmatically and/or declaratively) independently of any specific device platform. User interface qualities can be described using a generic scene graph structure with attached behaviors. The generic scene graph can then be used to drive the user interface on any number of different computing platforms using platform specific (e.g., rendering, gesture recognition, etc.) sub-systems. Platform specific sub-systems can vary based on technologies that are used by the platform specific sub-systems. For example, rendering sub-systems can vary based on the technology used to render graphical data, such as, for example, OpenGL, XAML, DirectX, Cocoa/Quartz, etc.

Specifying both static and dynamic user interface structures in a common way (that can then be used on multiple different computing platforms) enables more efficient code delivery, more code re-use and higher quality experiences. Specifying user interface structures in a common way also minimizes having to develop large and/or complex quantities of code for different computing platforms. Specifying user interface structures in a common way also helps insure that user interface functionality is consistent and reliable on different computing platforms.

In general, a scene graph is a hierarchical way of organizing graphical or visual data that is to be rendered onto a screen. Each node in the scene graph typically represents a visual element in the user interface. A high level parent node in the graph can represent a complex visual element (e.g., a bar chart). The parent node is in turn composed of child nodes that each represents a constituent visual element of the parent visual (e.g. axes, bars, legend). The child nodes are similarly composed of child nodes that represent progressively simpler visual elements (e.g. lines, shapes, text labels).

Nodes in a scene graph can have common attributes such as size, position, orientation, opacity, etc. Child nodes in the scene graph are positioned relative to their parent nodes. As such, visuals in the user interface can be more easily moved or reoriented by setting the position or orientation of the corresponding root node in the scene graph. Child nodes can be properly positioned when rendered since their position is defined relative to their parent. A similar mechanism can be used to propagate visual style information through the hierarchy. For example, setting the opacity of a parent node can cause child nodes to be rendered using the same opacity value.

Figure 1B:
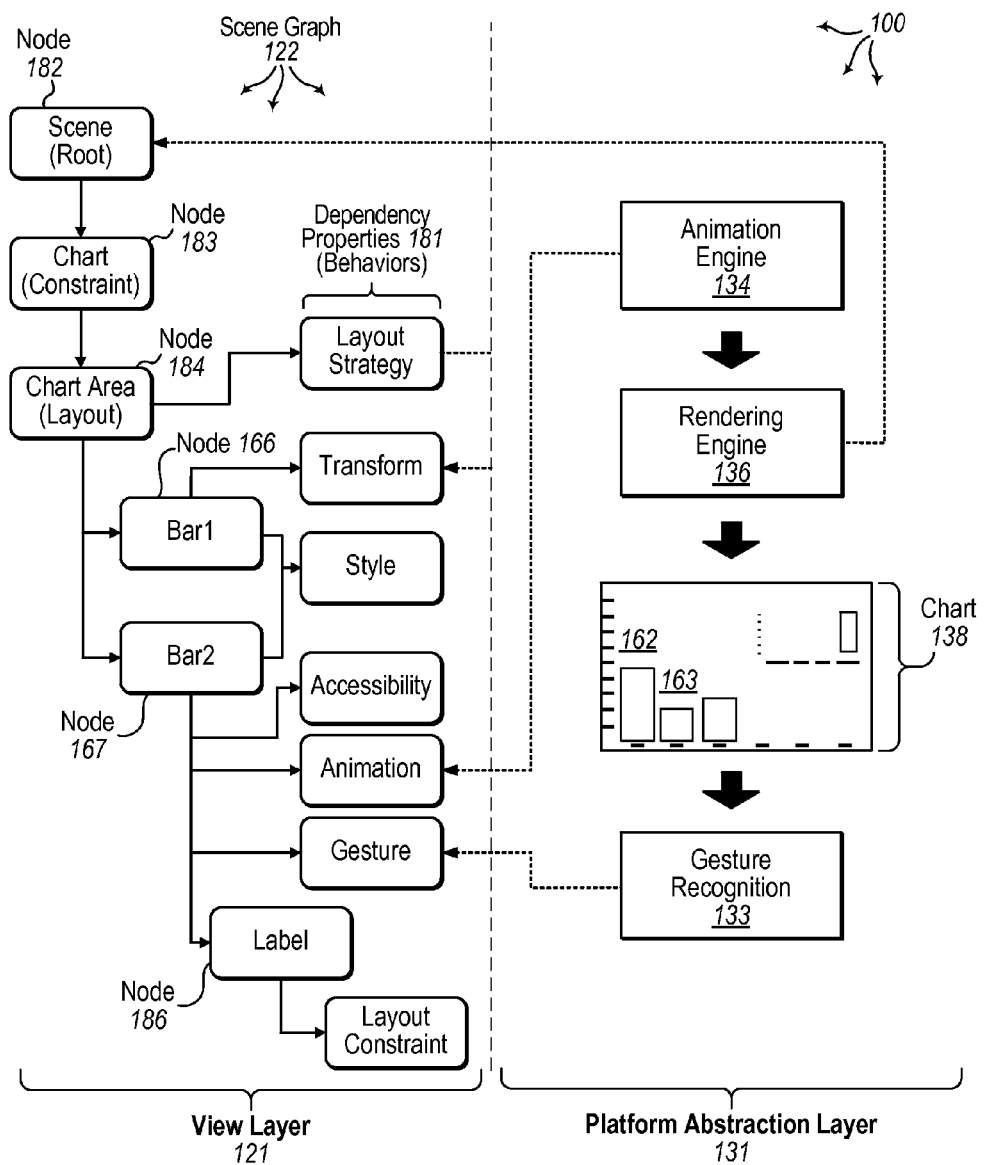

FIGS. 1A and 1B illustrate an example computer architecture 100 that facilitates cross-platform data visualizations using common descriptions. Referring to FIG. 1A, computer architecture 100 includes model layer 101, presented layer 111, view layer 121, and platform abstraction layer 131. Components at each of model layer 101, presenter layer 111, view layer 121, and platform abstraction layer 131 can be connected to one another over (or be part of) a local bus and/or a network, such as, for example, a Local Area Network ("LAN"), a Wide Area Network ("WAN"), and even the Internet. Accordingly, components at each of model layer 101, presenter layer 111, view layer 121, and platform abstraction layer 131 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the local bus and/or network.

As depicted, model layer 101 includes query response handler 102, data 103, and visual state 104. In general, the components of model layer 101 can interoperate to formulate a model defining data to be displayed or otherwise acted upon at a user interface. For example, chart definition 106 can define chart 138 that is to be displayed or otherwise acted upon at a user interface.

Presenter layer 111 includes hosting components 112. Hosting components 112 further include document controller 171, canvas 172, visualization pane 173, and visualization host 174. In general, presenter layer 111 also includes a presenter corresponding to the model type definition formulated in the model. In general, a presenter also acts upon a model and a view. The presenter retrieves data from repositories (the model), and formats it for display in the view.

As depicted, presenter layer 111 includes chart presenter 113. Chart presenter 113 includes chart data mapper 114, chart scene builder 116, and interaction handler 117. Chart presenter 113 can access chart definition 106 as well as data from hosting components 112. Chart data mapper 114, chart scene builder 116, and interaction handler 117 can interoperate to format chart definition 106 into scene graph 122.

View layer 121 includes scene graph 122. Scene graph 122 is an interface that displays data (chart definition 106). Scene graph 122 includes node 182 (the root node), node 183 (corresponding to chart 138), node 184 (for scrollview), node 166 (corresponding to stacked column 162), node 167 (corresponding to stacked column 163), and node 186 (corresponding to a label of stacked column 163). Nodes corresponding to other user interface elements in chart 138 can also be included in scene graph 122.

Scene graph 122 also includes dependency properties 181 defining behaviors attached to nodes. Attached behaviors can be used to specify how visual elements in the user interface are animated. Stock animations (such as easing functions) can be encapsulated in easy-to-reuse behaviors that can be simply attached to the node to be animated. More complex animations can be represented using configurable behaviors specifying the parameters of the animation and/or the target property of the node to be animated. Attached behaviors can also be used to specify the styling behavior of nodes in a scene graph so that the propagation of style information to child nodes (colors, fonts, opacity, visual effects, etc.) can be controlled.

Attached behaviors can encapsulate programmatic logic (such as layout logic described above) or can encapsulate information (meta-data) that can be used by a platform specific user interface sub-system (e.g., a rendering sub-system) to implement the specific behavior described. As such, attached behaviors represent a way to extend the scene graph approach so that it can be used to represent highly interactive user interfaces in a platform independent way. Attached behaviors can define the interactive nature of a user interface in a platform independent manner. Definition in a platform independent manner allows the platform specific user interface sub-systems to focus on translating behaviors into an efficient platform dependent implementation using appropriate platform specific tools and technologies.

Attached behaviors can be used to specify how a user interface is to be rendered for users requiring keyboard or screen reader support. For example, screen reader behaviors can be attached to certain nodes in a scene graph and used by the rendering sub-system to drive the platform specific screen reader implementation. Similarly, keyboard accessibility (shortcut keys, tab/focus control, etc.) can be configured by using behaviors attached to nodes in the scene graph. In these cases, a desired application behavior can be specified in a platform independent way using attached behaviors. Again, allowing platform specific user interface sub-systems to efficiently implement the behaviors using platform specific technologies.

Platform abstraction layer 131 includes resource manager 132, animation engine 134, and rendering engine 136. Resource manager 132 is configured to manage the resources consumed to output chart 138. Animation engine 134 is configured to implement animation logic using platform specific technologies. Rendering engine 136 (or some other output engine) implements rendering (or other output techniques) using platform specific technologies. For example, rendering engine 136 can render chart 138 on a display device. Alternately, other platform specific user interface sub-systems can output the data for chart 138 to a file.

Alternately, other platform specific user interface sub-systems can output the data for chart 138 via network communication to another computing device for further processing. The other computing device can include a rendering sub-system for rendering chart 138. The other computing system can return chart 138 via network communication for presentation in platform abstraction layer 131.

Attached behaviors can be used to specify how user input gestures (touch, mouse, keyboard, voice, video, etc., input gestures) are to be handled. Behaviors that represent specific gestures (such as tap, swipe, click) can be attached to a node in a scene graph and configured to invoke a certain command or action in the application. When a gesture recognizer detects a user input gesture, it routes input gesture data to the nearest scene graph for which a suitable gesture behavior is attached. The associated command or action is then automatically invoked. Gesture behaviors for different touch gestures can be attached to nodes throughout a scene graph hierarchy to implement more complex gesture handling scenarios.

Turning to FIG. 1B, platform abstraction layer 131 also includes gesture recognizer 133. Gesture recognizer 133 is responsible for handling user input and for routing event information to an appropriate behavior in scene graph 122. Gesture recognizer 133 can route gesture input data to an appropriate behavior in scene graph 122. The behavior in scene graph 122 can then route event data to presenter layer 111 to act upon data in chart 138 (e.g., activating an animation).

In some embodiments, a platform abstraction layer also includes a scene graph processing layer that is situated between a generic scene graphic and platform specific user interface sub-systems. The scene graph processing layer can select appropriate platform specific technologies for efficiently outputting a data visualization in view of hints indicated in the scene graph. In some embodiments, a scene graph processing layer selects different platform specific technologies based on the number of nodes or type of nodes in a scene graph. For example, depending on the number of nodes in a scene graph, a scene graph processing layer can instruct a rendering sub-system to use retained mode or immediate mode when rendering a data visualization.

A scene graph processing layer can also adjust input gesture data for consistency with a scene graph.

Figure 2:
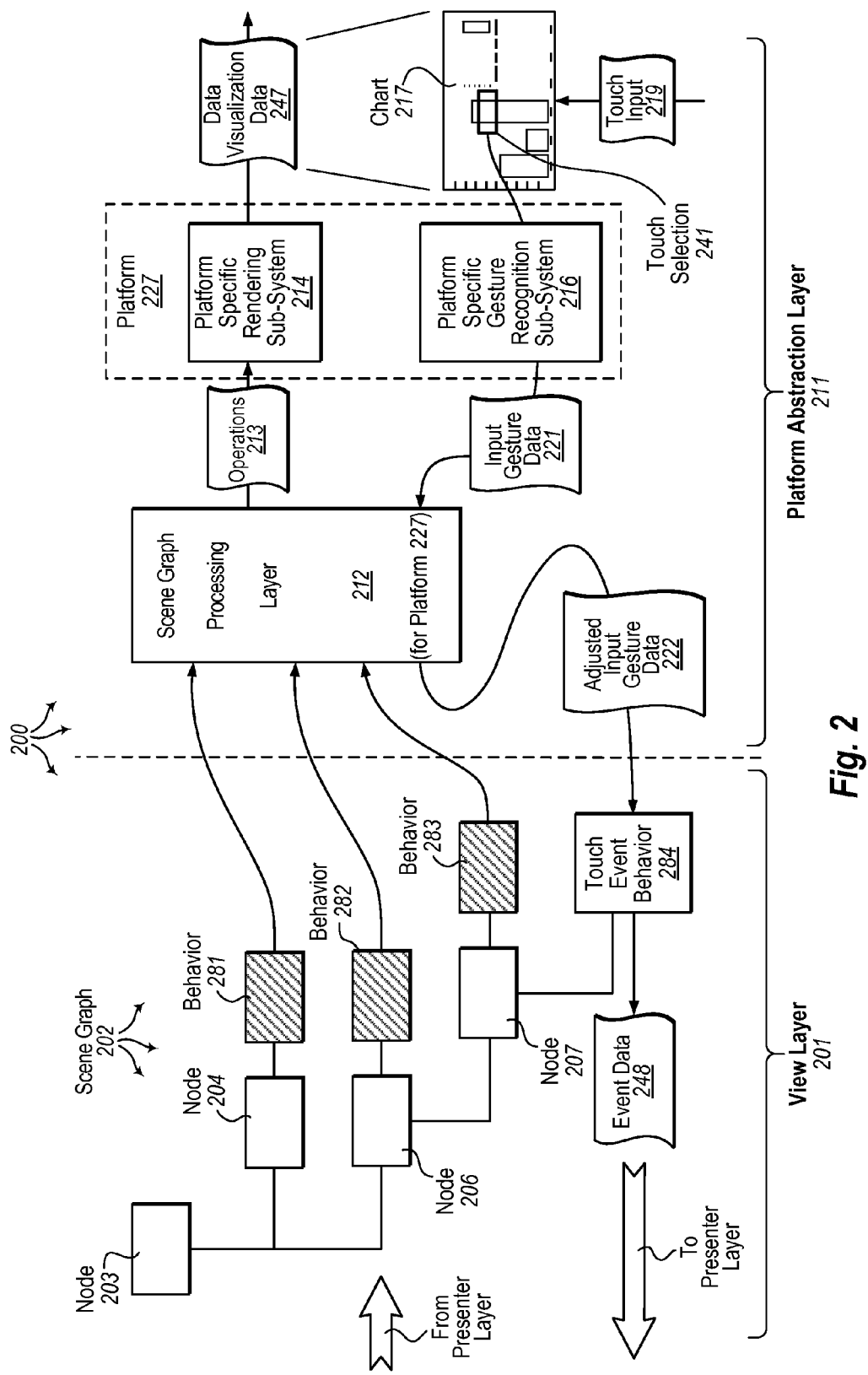
FIG. 2 illustrates an example computer architecture for outputting data visualizations and processing input gestures from data visualizations.

Turning to FIG. 2, FIG. 2 illustrates an example computer architecture 200 for outputting data visualizations and processing input gestures from data visualizations. Referring to FIG. 2, computer architecture 200 includes view layer 201 and platform abstraction layer 211. Components at each of view layer 201 and platform abstraction layer 211 can be connected to one another over (or be part of) a local bus and/or a network, such as, for example, a Local Area Network ("LAN"), a Wide Area Network ("WAN"), and even the Internet. Accordingly, components at each of model view layer 201 and platform abstraction layer 211 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the local bus and/or network.

View layer 201 includes scene graph 202. Scene graph 202 includes nodes 203, 204, 206, and 207 representing graphical elements in chart 217. Scene graph 202 also includes behaviors 281, 282, and 283 representing actions that can be taken on data in chart 217.

Platform 227 includes platform specific rendering sub-system 214 and platform specific gesture recognition sub-system 216. Platform 227 can be differentiated from other platforms by hardware and/or software used by platform 227. For example, platform 227 can be a Microsoft® Windows® platform (using XAML), which is different than an Apple iOS platform (using Quartz).

In general, behaviors in scene graph 202 can be handled at scene graph processing layer 212 and used to generate operations for efficiently outputting a data visualization at platform specific rendering sub-system 214. Platform specific rendering sub-system 214 can be a rendering sub-system, a file writing sub-system, or a network communication sub-system. Scene graph processing layer 212 can be specifically configured for use with platform 227. As such, scene graph processing layer 212 is aware of the characteristics of rendering sub-systems available to platform 227.

Figure 3:
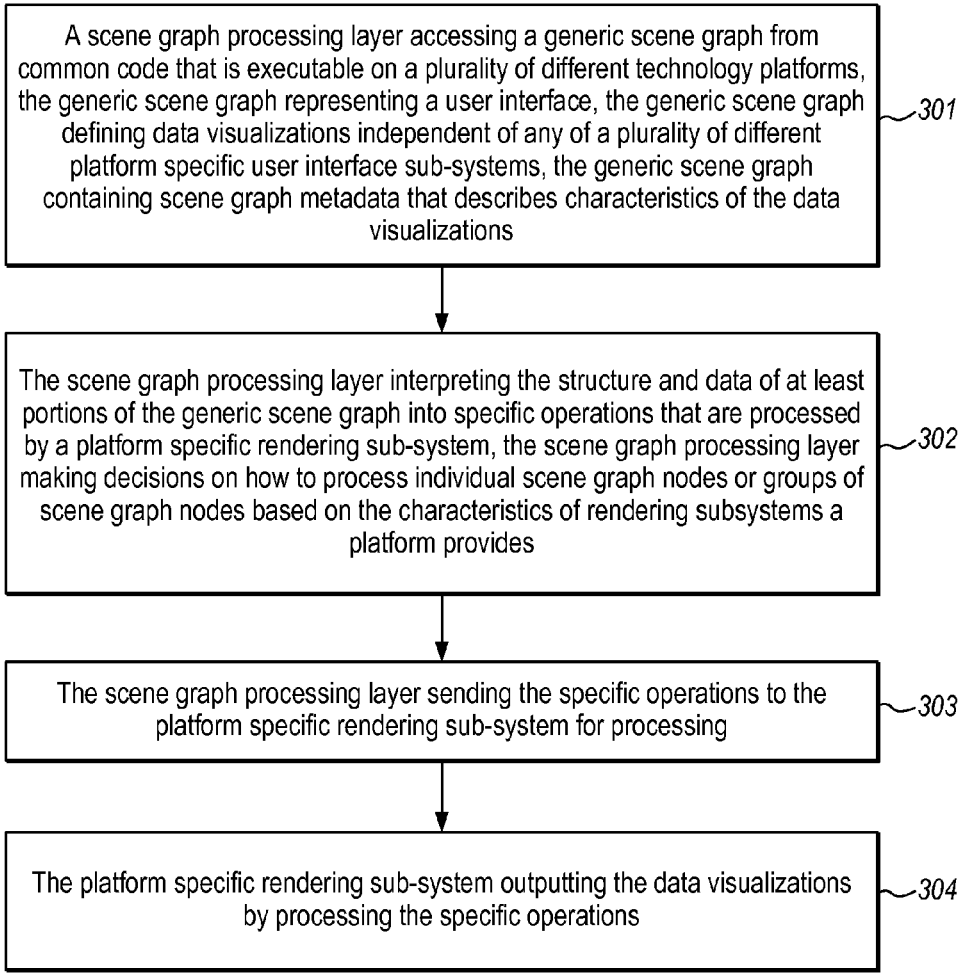
FIG. 3 illustrates a flow chart of an example method for outputting a data visualization.

FIG. 3 illustrates a flow chart of an example method 300 for outputting a data visualization. Method 300 will be described with respect to the components and data of computer architecture 200.

Method 300 includes the scene graph processing layer accessing a generic scene graph from common code that is executable on a plurality of different technology platforms, the generic scene graph representing a user interface, the generic scene graph defining data visualizations independent of any of a plurality of different platform specific user interface sub-systems, the generic scene graph containing scene graph metadata that describes characteristics of the data visualizations (301). For example, scene graph processing layer 212 can access scene graph 202. Scene graph 202 can originate from a presenter layer. Scene graph 202 can be included in common code that is executable on a plurality of different technology platforms. Scene graph 202 defines chart 217 independent of any plurality of different platform specific user interface sub-systems, such as, for example, sub-systems that use Quartz® for rendering or sub-systems that XAML for rendering. Scene graph 202 contains metadata that describes chart 217. Metadata can be expressly included in scene graph 202 or can be inferred from the features of scene graph 202.

Method 300 includes the scene graph processing layer interpreting the structure and data of at least portions of the generic scene graph into specific operations that are processed by a platform specific rendering sub-system, the scene graph processing layer making decisions on how to process individual scene graph nodes or groups of scene graph nodes based on characteristics of rendering subsystems a platform provides (act 302). For example, scene graph processing layer 212 can interpret the structure and data of portions of scene graph 202 into operations 213 for consumption by platform specific rendering sub-system 214. Scene graph processing layer 212 can make decisions on how to process individual scene graph nodes or groups of scene graph nodes form scene graph 222 based on characteristics of rendering subsystems in platform 227, including platform specific rendering sub-system 214. Rendering sub-system characteristics can include current machines state, such as, for example, available memory, CPU speed, etc.

Scene graphic processing layer 212 can make decisions based on the most optimal rendering sub-system the platform provides. Scene graph processing layer 212 can optimize operations 213 for efficient processing (e.g., immediate mode versus retained mode or vice versa) at platform specific rendering sub-system 214 based on data visualization processing techniques available platform specific rendering sub-system 214 and in view of metadata from scene graph 202.

Method 300 includes the scene graph processing layer sending the specific operations to the platform specific rendering sub-system for processing (303). For example, scene graph processing layer 212 can send operations 213 to platform specific rendering sub-system 214 for processing. Platform specific rendering sub-system 214 can receive operations 213 from scene graph processing layer 212.

Method 300 includes the platform specific rendering sub-system outputting the data visualizations by processing the specific operations (304). For example, platform specific rendering sub-system 214 can output data visualization data 247 by processing operations 213. In some embodiments, platform specific rendering sub-system 214 renders data visualization data 247 as chart 217. In other embodiments, platform specific rendering sub-system 214 renders data visualization data 247 to a file or sends data visualization data 247 via network communication to another system for further processing respectively.

As described, scene graph processing layer 212 can be specifically configured for use with platform 227. As such, scene graph processing layer 212 is aware of gesture recognition techniques and input gesture data formats available to platform specific gesture recognition sub-system 216.

Figure 4:
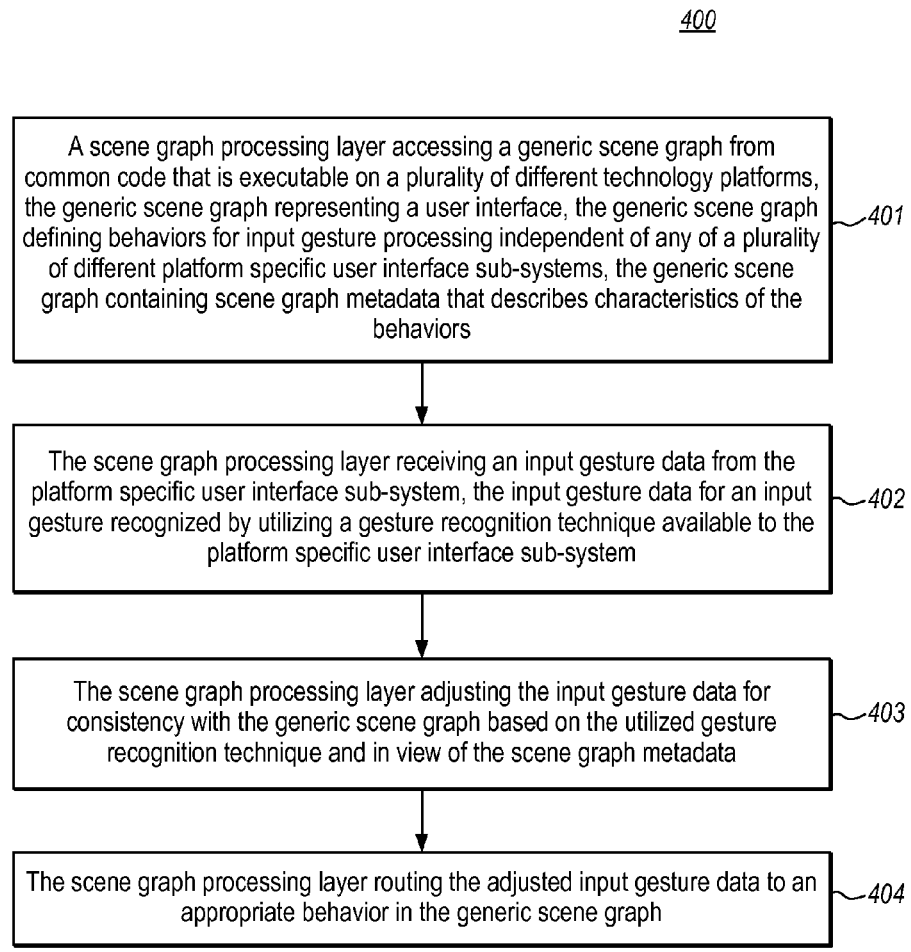
FIG. 4 illustrates a flow chart of an example method for processing an input gesture from a data visualization.

FIG. 4 illustrates a flow chart of an example method 400 for processing an input gesture from a data visualization. Method 400 will be described with respect to the components and data of computer architecture 200.

Method 400 includes a scene graph processing layer accessing a generic scene graph from common code that is executable on a plurality of different technology platforms, the generic scene graph representing a user interface, the generic scene graph defining behaviors for input gesture processing independent of any of a plurality of different platform specific user interface sub-systems, the generic scene graph containing scene graph metadata that describes characteristics of the behaviors (401). For example, scene graph processing layer 212 can access scene graph 202. Scene graph 202 can originate from a presenter layer. Scene graph 202 can be included in common code that is executable on a plurality of different technology platforms. Scene graph 202 defines touch event behavior 284 independent of any plurality of different platform specific user interface sub-systems, such as, for example, sub-systems that use Quartz for rendering and sub-systems that XAML for rendering. Scene graph 202 can contain metadata that describes the characteristics of touch event behavior 284, such as, for example, a data format.

A user can enter touch input 219 onto a touch screen display device displaying chart 217. Platform specific gesture recognition sub-system 216 can recognize touch selection 241 as specified type of input gesture (e.g., swipe, select, tap, etc.) by utilizing an available gesture recognition technique on touch input 219. Platform specific gesture recognition sub-system 216 can generate input gesture data 221 based on the specified type of input gesture. Platform specific gesture recognition sub-system 216 can send input gesture data 221 to scene graph processing layer 212.

Method 400 includes the scene graph processing layer receiving an input gesture data from the platform specific user interface sub-system, the input gesture data for an input gesture recognized by utilizing a gesture recognition technique available to the platform specific user interface sub-system (402). For example, scene graph processing layer 212 can receive input gesture data 221 from platform specific gesture recognition sub-system 216.

Method 400 includes the scene graph processing layer adjusting the input gesture data for consistency with the generic scene graph based on the utilized gesture recognition technique and in view of the scene graph metadata (403). For example, scene graph processing layer 212 can adjust input gesture data 221 into adjusted input gesture data 222. Input gesture data 221 can be adjusted into adjusted input gesture data 222 for consistency with scene graph 202 based on the gesture recognition technique used by platform specific gesture recognition sub-system 216 and in view of metadata describing touch event behavior 284.

Method 400 includes the scene graph processing layer routing the adjusted input gesture data to an appropriate behavior in the generic scene graph (404). For example, scene graph processing layer 212 can route adjusted input gesture data 222 to touch event behavior 284. Touch event behavior 284 can in turn translate adjusted input gesture data 222 into event data 248. Touch event behavior 284 can send event data 248 to a presenter layer for processing.

Figure 5:
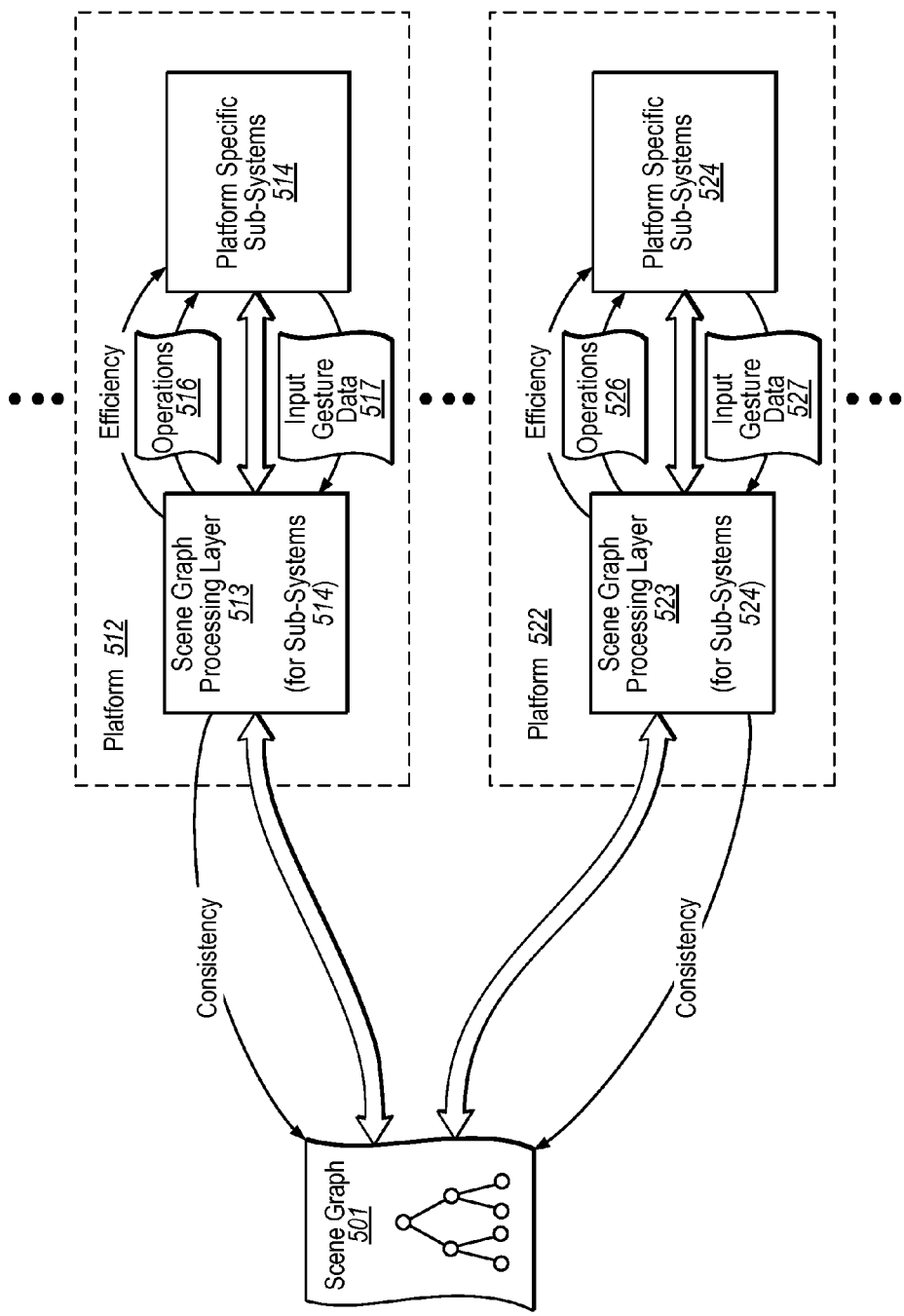
FIG. 5 illustrates utilizing a generic scene graph on different computing platforms.

FIG. 5 illustrates utilizing a generic scene graph 501 on different computing platforms. As depicted, FIG. 5 includes platform 512 and platform 522. Platform 512 and platform 522 can be differentiated by hardware and/or software. For example, platform 512 can include an ARM processor, use Microsoft® Windows® as an operating system, and can use XAML for graphical rendering. On the other hand, platform 522 can include an A6 processor, use Apple iOS as an operating system, and use Quartz® for graphical rendering.

Platform 512 includes scene graph processing layer 513. Scene graph processing layer 513 is configured for use with platform specific sub-systems 514. Thus, scene graph processing layer 513 is aware of data visualization output (e.g., rendering) techniques and gesture recognition techniques available to platform specific sub-systems 514.

Likewise, platform 522 includes scene graph processing layer 523. Scene graph processing layer 523 is configured for use with platform specific sub-systems 524. Thus, scene graph processing layer 523 is aware of data visualization output (e.g., rendering) techniques and gesture recognition techniques available to platform specific sub-systems 524. Scene graph processing layer 513 and scene graph processing layer 523 can account for the differences in platforms 512 and 522 respectively. As such, both of platforms 512 and 522 can appropriately utilize scene graph 501 in an efficient and consistent manner.

For example, scene graph processing layer 513 can configure operations, such as, operations 516, for efficiently rendering a data visualization at platform specific sub-systems 514. The configuration of operations can be based on the data visualization output techniques available at platform specific sub-systems 514 and in view of metadata indicated in scene graph 501. Scene graph processing layer 513 can also adjust input gesture data platform specific sub-systems 514, such as, input gesture data 517, for consistency with scene graph 501. Input gesture data can be adjusted based on the gesture recognition techniques available to platform specific sub-systems 514 and any metadata related to input gesture behaviors in scene graph 501.

Likewise, scene graph processing layer 523 can configure operations, such as, operations 526, for efficiently rendering a data visualization at platform specific sub-systems 524. The configuration of operations can be based on the data visualization output techniques available at platform specific sub-systems 524 and in view of metadata indicated in scene graph 501. As such, configuring operations for efficient rendering at platform specific sub-systems 524 can be different than configuring operations for efficient rendering at platform specific sub-systems 514.

Scene graph processing layer 523 can also adjust input gesture data from platform specific sub-systems 524, such as, input gesture data 527, for consistency with scene graph 501. Input gesture data can be adjusted based on the gesture recognition techniques available to platform specific sub-systems 524 and any metadata related to input gesture behaviors in scene graph 501. As such, adjusting input gesture data from platform specific sub-systems 524 can different from adjusting input gesture data from platform specific sub-systems 514.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system, the computer system including a user interface management system, the user-interface management system including a scene graph processing layer and a platform specific user interface sub-system, the scene graph processing layer aware of the data visualization processing techniques available to the platform specific user interface sub-system, a method for outputting a data visualization, the method comprising:

the scene graph processing layer accessing a generic scene graph from common code that is executable on a plurality of different technology platforms, the generic scene graph representing a user interface, the generic scene graph defining the data visualizations independent of any of a plurality of different platform specific user interface sub-systems, including the platform specific user interface sub-system, the generic scene graph containing scene graph metadata that describes characteristics of the data visualizations, at least part of the scene graph metadata inferred from the features of the generic scene graph;

the scene graph processing layer interpreting the structure and data of at least portions of the generic scene graph into specific operations that are processed by a platform specific rendering sub-system, the scene graph processing layer making decisions on how to process individual scene graph nodes or groups of scene graph nodes based on the characteristics of rendering subsystems a platform provides;

the scene graph processing layer sending the specific operations to the platform specific rendering sub-system for processing; and the platform specific rendering sub-system outputting the data visualizations by processing the specific operations.

2. The method of claim 1, wherein the platform specific rendering sub-system uses one of: a markup language or a graphics platform library to render the platform specific graphical data.

3. The method of claim 1, wherein the platform specific rendering sub-system is a platform specific communication sub-system, the platform specific communication sub-system connected to a platform specific rendering sub-system via network communication.

4. The method of claim 1, wherein accessing a generic scene graph comprises accessing a generic scene graph that includes a specified type of node; and further comprising:

the scene graph processing layer inferring the at least part of the scene graph metadata based on inclusion of the specified type of node in the generic scene graph prior to generating the specific operations.

5. The method of claim 1, wherein accessing a generic scene graph comprises accessing a generic scene graph that includes a specified number of nodes; and further comprising:

the scene graph processing layer inferring the at least part of the scene graph metadata based on the specified number of nodes prior to generating the specific operations.

6. The method of claim 1, wherein interpreting the structure and data of at least portions of the generic scene graph into specific operations comprises interpreting the structure and data of at least portions of the generic scene graph into specific operations for rendering the data visualizations using retained mode.

7. The method of claim 1, wherein interpreting the structure and data of at least portions of the generic scene graph into specific operations comprises interpreting the structure and data of at least portions of the generic scene graph into specific operations for rendering the data visualizations using immediate mode.

8. At a computer system, the computer system including a user interface management system, the user-interface management system including a scene graph processing layer and a platform specific user interface sub-system, the scene graph processing layer aware of the gesture recognition processing techniques available to the platform specific user interface sub-system, a method for processing an input gesture from a data visualization, the method comprising:
the scene graph processing layer accessing a generic scene graph from common code that is executable on a plurality of different technology platforms, the generic scene graph representing a user interface, the generic scene graph defining behaviors for input gesture processing independent of any of a plurality of different platform specific user interface sub-systems, including the platform specific user interface sub-system, the generic scene graph containing scene graph metadata that describes characteristics of the behaviors;
the scene graph processing layer receiving an input gesture data from the platform specific user interface sub-system, the input gesture data for an input gesture recognized by utilizing a gesture recognition technique available to the platform specific user interface sub-system;
the scene graph processing layer adjusting the input gesture data for consistency with the generic scene graph based on the utilized gesture recognition technique and in view of the scene graph metadata; and
the scene graph processing layer routing the adjusted input gesture data to an appropriate behavior in the generic scene graph.

9. The method of claim 8, wherein the platform specific user interface sub-system is a platform specific user input sub-system.

10. The method of claim 8, wherein receiving input gesture data comprises receiving input gesture data for a recognized mouse or keyboard input gesture.

11. The method of claim 8, wherein receiving input gesture data comprises receiving input gesture data for a recognized touch input gesture.

12. The method of claim 8, wherein receiving input gesture data comprises receiving input gesture data for a recognized voice or video input gesture.

13. A computer system, the computer system comprising:
one or more processors;
system memory;
one or more components of a specific technology platform;
one or more computer storage devices having stored thereon computer-executable instructions representing a scene graph processing layer, the scene graph processing layer aware of the data visualization processing techniques available to the specific technology platform, the scene graph processing layer aware of the gesture recognition processing techniques available to the specific technology platform, the scene graph processing layer configured to:
access a generic scene graph from common code that is executable on a plurality of different technology platforms, the generic scene graph representing a user interface, the generic scene graph:
defining one or more data visualizations independent of any of a plurality of different technology platforms, including the specified technology platform;
defining behaviors for input gesture processing independent of any of the plurality of different technology platforms, including the specified technology platform; and
indicating scene graph metadata that both describes characteristics of the one or more data visualizations and describes characteristics of the behaviors for input gesture processing;
output a data visualization by:
interpreting the structure and data of at least portions of the generic scene graph into specific operations that are processed by the platform specific user interface sub-system, making decisions on how to process individual scene graph nodes or groups of scene graph nodes based on the characteristics of rendering subsystems a platform provides; and
sending the specific operations to the specific technology platform for output by processing the specific operations; and
process an input gesture by:
receiving input gesture data from the specific technology platform, the input gesture data for an input gesture recognized by utilizing a gesture recognition technique available to the specific technology platform;
adjusting the input gesture data for consistency with the generic scene graph based on the utilized gesture recognition technique and in view of the scene graph metadata; and
routing the adjusted input gesture data to an appropriate behavior in the generic scene graph.

14. The system of claim 13, wherein the specific technology platform uses one of: a markup language or a graphics platform library to render the platform specific graphical data.

15. The system of claim 13, wherein the one or more components of the specific technology platform include a rendering sub-system.

16. The system of claim 13, wherein the one or more components of the specific technology platform include a communication sub-system, the communication sub-system connected to a rendering sub-system via network communication.

17. The system of claim 13, wherein interpreting the structure and data of at least portions of the generic scene graph into specific operations comprises interpreting the structure and data of at least portions of the generic scene graph into specific operations for rendering the data visualizations using retained mode.

18. The system of claim 13, wherein interpreting the structure and data of at least portions of the generic scene graph into specific operations comprises interpreting the structure and data of at least portions of the generic scene graph into specific operations for rendering the data visualizations using immediate mode.

19. The system of claim 13, wherein receiving input gesture data comprises receiving input gesture data for one of: a recognized mouse input gesture, a recognized keyboard input gesture, a recognized voice input gesture, or a recognized video input gesture.

20. The system of claim 13, wherein receiving input gesture data comprises receiving input gesture data for a recognized touch gesture.

\* \* \* \* \*